March 10, 1970     S. TAYLOR     3,500,099
LEAD OXIDE PHOTOCONDUCTIVE MEMBERS AND METHOD OF
PRODUCING SUCH MEMBERS
Filed March 20, 1968

United States Patent Office 3,500,099
Patented Mar. 10, 1970

---

3,500,099
LEAD OXIDE PHOTOCONDUCTIVE MEMBERS AND METHOD OF PRODUCING SUCH MEMBERS
Stanley Taylor, Sunbury-on-Thames, England, assignor to Electric & Musical Industries Limited, Hayes, England, a company of Great Britain
Filed Mar. 20, 1968, Ser. No. 714,682
Claims priority, application Great Britain, Mar. 31, 1967, 14,900/67
Int. Cl. H01j 31/26
U.S. Cl. 313—65                    3 Claims

ABSTRACT OF THE DISCLOSURE

This specification describes the manufacture of a lead oxide photoconductive member in which a first thin layer of lead oxide is vapour deposited in a vacuum on a signal plate and a second thicker layer of lead oxide is vapour deposited onto the first layer in an atmosphere including oxygen and water vapour. A pick-up tube using the photoconductive member as a target is also described.

---

Figure 1:
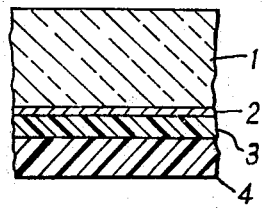

The present invention relates to photo-conductive members. In published Dutch patent application No. 290,119 (which corresponds to U.S. patent specification No. 3,372,056) various examples are described of methods of producing a photo-conductive target including lead oxide, for use in a television pick-up tube of the vidicon type.

According to the specification a desirable structure for the lead oxide target consists of a thin layer of n-conductive lead oxide adjacent the conductive signal electrode followed by a relatively thick layer (at least $4\mu$ thick) of intrinsic type conductive lead oxide, and at the surface which is scanned by the electron beam a thin layer of p-type conductive lead oxide. As described in the said specification, the relatively thick layer of intrinsic type conductivity is produced by vapour depositing lead oxide in an atmosphere containing oxygen and water vapour, or other water forming gas. The partial pressures of the oxygen and water forming gas are balanced relative to one another to ensure that the layer when deposited behaves as intrinsic or nearly intrinsic conductive material. A thin layer of p-type conductivity is produced by performing a final deposition of lead oxide in an atmosphere consisting principally of oxygen, or by exposing the target to a discharge in oxygen. For the formation of the layer of n-type conductivity, the aforesaid specification suggests the incorporation of bismuth or antimony in the lead oxide, for example by providing such metal on the conductive electrode.

The present invention is concerned primarily with the step, in a method such as described in the preceding paragraph, of forming a layer of n-type conductivity adjacent the signal electrode.

One object of the present invention is to provide an improved method for producing a photo-conductive member including lead oxide which facilitates the achievement of an acceptably short lag.

Another object of the present invention is to provide an improved method of producing a photo-conductive member including lead oxide which facilitates the achievement of reproducible results.

A further object of the present invention is to provide a simpler method for producing a photo-conductive member including lead oxide.

In accordance with the present invention there is provided a method for producing a photo-conductive member which comprises the steps of vapour depositing on a conductive signal electrode a thin layer of lead oxide in vacuum, and vapour depositing on said layer a thicker layer of lead oxide in an atmosphere including oxygen and water vapour.

Another object of the present invention is to provide an improved photo-conductive member which has a relatively short lag.

In accordance with the invention, this object is achieved by providing a photo-conductive member which comprises a relatively thick layer of lead oxide which is of substantially intrinsic conductivity type, the said layer being deposited on a relatively thin layer of lead oxide supported on a signal plate, said thin layer being of n-type conductivity due to deficiency of oxygen.

It is believed that the production of a pick-up tube using the lead oxide photo-conductor in accordance with the invention is successful in overcoming the disadvantage of the long lag of previous pick-up tubes because the lead oxide deposited by evaporation in vacuum loses a proportion of its oxygen content and is deposited as or becomes an n-type semi-conductor. An n-type layer adjacent to the signal plate is desirable to provide a barrier to the injection of holes from the signal plate into the photoconductive layer. It is considered therefore that the barrier formed by the vacuum evaporated lead oxide layer adjacent to the signal plate gives a better distribution of potential through the lead oxide photo-conductive layer and that this contributes to the low lag of the target. The present invention provides a simple and controllable step for producing a layer of n-type conductivity next to the signal electrode and therefore it facilitates the achievement of consistent results.

Figure 2:
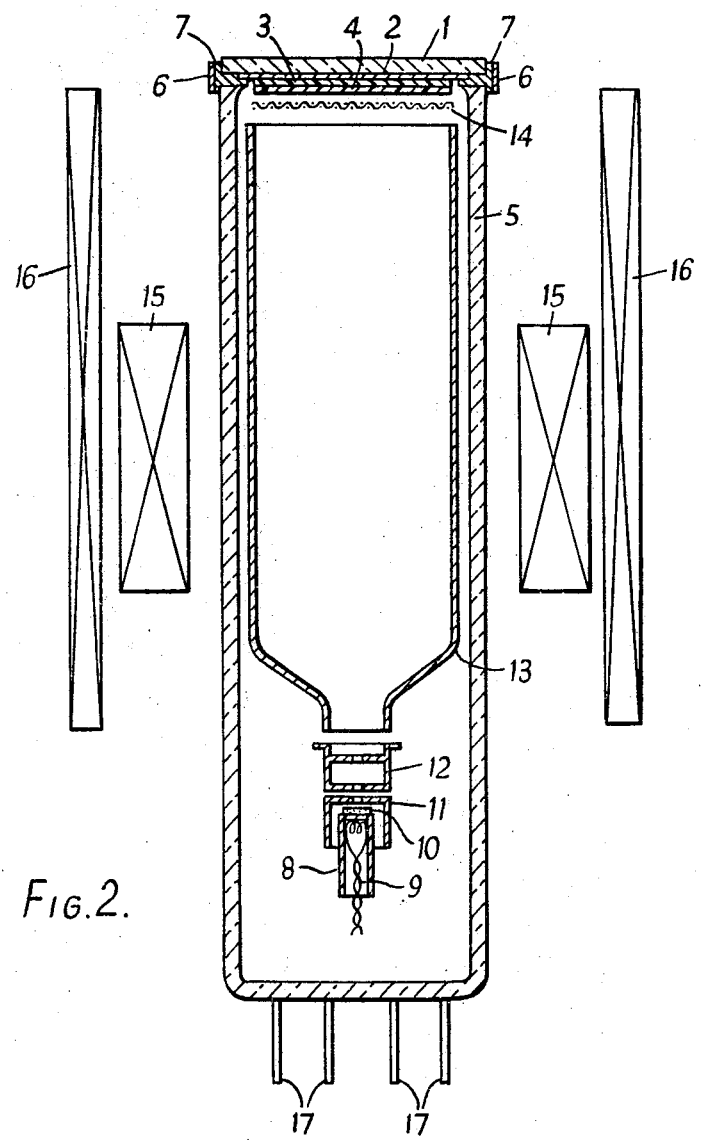

In order that the invention may be fully understood and readily carried into effect it will now be described with reference to the accompanying drawings, of which:

FIGURE 1 shows a cross-section of part of the window of a pick-up tube incorporating as the target a photoconductive member according to one example of the invention, and FIGURE 2 is a cross-sectional diagram of the pick-up tube.

In FIGURE 1 the reference 1 indicates the glass window of a pick-up tube on which is deposited a transparent conducting layer forming the signal plate 2. On the signal plate 2 are formed two layers 3 and 4 of lead oxide. The first layer 3 adjacent to the signal plate 2 is formed of evaporation of lead oxide in a vacuum of the order of $5 \times 10^{-6}$ torr, that is to say in the range $5 \times 10^{-5}$ to $5 \times 10^{-7}$ torr, with the signal plate at a temperature between 20° C. and 120° C., although this temperature range is not critical, the layer having a thickness of between 0.1 and 0.4 micron. The second layer 4 of lead oxide is also formed by evaporation but in an atmosphere of oxygen with up to 50% by weight of water vapour at a total pressure of the order of $10^{-2}$ torr, that is to say, in the range $10^{-1}$ to $10^{-3}$ torr. The second layer 4 is deposited on to the first layer 3 whilst it is maintained at a temperature between 100° C. and 120° C. and is formed to a thickness of about 10 to 20 microns. As is known, the process for producing the second layer is such that the second layer is of substantially intrinsic type conductivity. Any subsequent processing of the target may be in accordance with known techniques.

The signal plate 2 may be of any suitable material and is typically formed of an oxide of tin known as NESA formed by the deposition of a film of stannous chloride onto the window 1 in an oxidising atmosphere.

FIGURE 2 is a cross-sectional diagram of a pick-up tube having as a target a photo-conductive member according to an example of the invention, and including the window 1 on which is deposited the signal plate 2 and the lead oxide layers 3 and 4. The window 1 is sealed to the cylindrical part of the envelope 5 of the tube by indium 7 which also serves to connect the signal plate 2 to a contact ring 6. Within the envelope are provided an electron gun including a cathode 8 with a heater 9 and an emitting surface 10. Two apertured electrodes 11 and 12 are provided to form a narrow electron beam directed towards the target formed by the lead oxide layers 3 and 4, a wall anode 13 being provided to assist in the formation of the beam. Close to the target electrode and parallel to it is provided a mesh electrode 14.

External to the envelope 5 are provided magnetic deflecting coils 15 and a focussing solenoid 16. The base of the envelope 5 has pins 17 which are connected internally to the various electrodes of the tube, although for clarity of illustration the connecting leads are not shown in the figure. Moreover, the supporting structure for the electrodes has been omitted from FIGURE 2 as this structure may take any suitable form and many such forms would be known to those skilled in the art.

In the operation of the tube shown in FIGURE 2 a suitable current is caused to flow through the heating element to raise the temperature of the cathode 8 sufficiently to cause the emitting surface 10 to emit electrons. Suitable potentials are applied to the electrodes 10 and 11 and to the wall anode 13 to form the electrons into a narrow beam directed towards the target formed by the layers 3 and 4 of lead oxide. The mesh electrode 14 which may be maintained at the same potential as the wall anode 13, or at another potential, is provided to cause the electrons of the beam emitted by the cathode 8 to impinge more nearly normally on to the layer 4. In the manner well-known to those skilled in the art, a video signal corresponding to an image focussed onto the target electrode appears on the signal plate 2 and is transmitted through the indium seal 7 to the ring connector 6. Suitable deflecting potentials are applied to the deflecting coils 15 and the solenoid 16 receives such current as is required to focus the beam of electrons to a fine spot on the target electrode.

Although the invention has been described with reference to a specific example it will be appreciated that it is not limited to this example. For example, a photoconductive member according to the invention may be used as a photo-electric cell.

What I claim is:

1. A method for producing a photo-conductive member which comprises the steps of vapour depositing on a conductive signal electrode a thin layer of lead oxide in vacuum, and vapour depositing on said layer a thicker layer of lead oxide in an atmosphere including oxygen and water vapour.

2. A method of manufacturing a photo-conductive member according to claim 1 comprising the step of evaporating (a) said first layer of lead oxide in a vacuum of the order of $5 \times 10^{-6}$ torr on to a surface having a temperature of between 20° C. and 120° C. to a thickness of 0.1 to 0.4 micron, and evaporating (a) said second layer of lead oxide on top of said first layer in an atmosphere of oxygen with up to 50% by weight of water vapour at a total pressure of the order of $10^{-2}$ torr, said first layer being maintained at a temperature of between 100° C. and 120° C., and the second layer having a thickness of 10 to 20 microns.

3. A photo-conductive member which comprises a relatively thick layer of lead oxide which is substantially intrinsic conductvity type, the said layer being deposited on a relatively thin layer of lead oxide supported on a signal plate, said thin layer being of n-type conductivity due to deficiency of oxygen.

References Cited

UNITED STATES PATENTS

| | | | |
|---|---|---|---|
| 2,886,726 | 5/1959 | Berger et al. | 117—106 X |
| 2,888,370 | 5/1959 | Damon et al. | 117—201 |
| 2,890,359 | 6/1959 | Heijne et al. | 313—65 |
| 3,003,075 | 10/1961 | Krieger et al. | 313—65 |
| 3,289,024 | 11/1966 | deHaan et al. | 313—65 |
| 3,372,056 | 3/1968 | deHaan et al. | 117—200 |

JAMES W. LAWRENCE, Primary Examiner

V. LAFRANCHI, Assistant Examiner

U.S. Cl. X.R.

117—211, 215; 313—102